(12) United States Patent
Mayeur et al.

(10) Patent No.: US 11,804,742 B2
(45) Date of Patent: *Oct. 31, 2023

(54) ROTOR FOR AN ELECTROMAGNETIC MOTOR OR GENERATOR WITH TAPERED BRANCHES

(71) Applicant: Whylot SAS, Cambes (FR)

(72) Inventors: Loic Mayeur, Saint Santin (FR); Romain Ravaud, Labastide-Murat (FR)

(73) Assignee: Whylot SAS, Cambes (FR)

( * ) Notice: Subject to any disclaimer, the term of this patent is extended or adjusted under 35 U.S.C. 154(b) by 370 days.

This patent is subject to a terminal disclaimer.

(21) Appl. No.: 17/056,155

(22) PCT Filed: Jun. 17, 2019

(86) PCT No.: PCT/IB2019/055036
§ 371 (c)(1),
(2) Date: Nov. 17, 2020

(87) PCT Pub. No.: WO2019/243996
PCT Pub. Date: Dec. 26, 2019

(65) Prior Publication Data
US 2021/0313853 A1 Oct. 7, 2021

(30) Foreign Application Priority Data
Jun. 22, 2018 (FR) ...................................... 1800691

(51) Int. Cl.
*H02K 1/02* (2006.01)
*H02K 1/2795* (2022.01)
(Continued)

(52) U.S. Cl.
CPC ............. *H02K 1/2795* (2022.01); *H02K 1/02* (2013.01); *H02K 1/30* (2013.01); *H02K 15/03* (2013.01);
(Continued)

(58) Field of Classification Search
CPC .. H02K 1/00; H02K 1/02; H02K 1/04; H02K 1/2793; H02K 1/2795; H02K 1/2796;
(Continued)

(56) References Cited

U.S. PATENT DOCUMENTS 5,021,698 A * 6/1991 Pullen ..................... H02K 15/03
310/112
5,619,087 A * 4/1997 Sakai ....................... H02K 1/12
310/410
(Continued)

FOREIGN PATENT DOCUMENTS

EP 0353042 1/1990
EP 2773023 9/2014
(Continued)

OTHER PUBLICATIONS

Kaneko et al., Machine Translation of JP2004007937, Jan. 2004 (Year: 2004).*
(Continued)

*Primary Examiner* — Eric Johnson
(74) *Attorney, Agent, or Firm* — Crockett & Crockett, PC; K. David Crockett, Esq.

(57) ABSTRACT

The invention relates to a rotor (1) of an electromagnetic motor or generator having a body comprising an inner hub (2) which is concentric to a central axis (7) of rotation of the rotor (1), branches (3) extending radially with respect to the central axis (7) of rotation from the inner hub (2) towards a hoop (8) forming a circular outer periphery of the rotor (1), at least one magnet (10) being housed in each space delimited between two adjacent branches (3), each having a width which decreases with distance from the inner hub (2) and terminates by a tapered tip (3b) against the hoop (8). Each magnet is in the form of a magnet structure (10) consisting of a plurality of individual magnets (4) which are secured together by a fiber-reinforced insulating material, each indi-
(Continued)

vidual magnet (4) being elongated in shape by extending in the axial direction of the rotor (1).

11 Claims, 3 Drawing Sheets

(51) Int. Cl.
  *H02K 1/30* (2006.01)
  *H02K 15/03* (2006.01)
  *H02K 16/04* (2006.01)
  *H02K 21/24* (2006.01)
(52) U.S. Cl.
  CPC ............. *H02K 16/04* (2013.01); *H02K 21/24* (2013.01); *H02K 2213/12* (2013.01)
(58) Field of Classification Search
  CPC .......... H02K 1/2798; H02K 1/24; H02K 1/28; H02K 1/30; H02K 15/03; H02K 16/00; H02K 16/02; H02K 16/04; H02K 2213/12
  See application file for complete search history.

(56) References Cited

U.S. PATENT DOCUMENTS

| | | | |
|---|---|---|---|
| 2006/0238056 A1* | 10/2006 | Alvarez | H02K 1/2793 310/268 |
| 2019/0234251 A1* | 8/2019 | Yokoyama | H02K 7/083 |
| 2021/0218290 A1* | 7/2021 | Ravaud | H01F 7/02 |

FOREIGN PATENT DOCUMENTS

| | | | | |
|---|---|---|---|---|
| FR | 1475501 | | 3/1967 | |
| FR | 3014255 | | 6/2015 | |
| GB | 2511320 | A * | 9/2014 | ........... H02K 1/2793 |
| JP | 2004007937 | A * | 1/2004 | |

OTHER PUBLICATIONS

International Search Report dated Nov. 21, 2019 from IA No. PCT/IB2019/055036.

* cited by examiner

ROTOR FOR AN ELECTROMAGNETIC MOTOR OR GENERATOR WITH TAPERED BRANCHES

FIELD OF THE INVENTIONS

This invention relates to a rotor for an electromagnetic motor or generator with axial flux having an advantageously enlarged hub from which project tapered branches with at least one magnet structure between two adjacent branches. The invention further relates to an electromagnetic motor or generator equipped with a rotor of this type.

BACKGROUND

This invention is advantageously but not restrictively applicable to an electromagnetic motor that delivers high power at a high speed of rotation of the rotor, which is achieved by the specific characteristics of the rotor according to the present invention. A motor of this type can be used, for example, as an electromagnetic motor in a fully electric or hybrid automotive vehicle.

Advantageously but not restrictively, the electromagnetic motor or generator can comprise at least one rotor framed by two stators, whereby these elements can be superimposed on one another and can be separated by at least one air gap on the same shaft.

In high-speed applications it is necessary to have a very good mechanical strength of the rotating part, i.e. the rotor, to improve the reliability of the system.

For an electromagnetic machine with axial flux, the rotor comprises a body in the form of a discoid support for magnets that have two circular faces connected by a thickness, the disc being delimited between an outer rim formed by a binding band and an inner periphery delimiting a cavity for a rotation shaft.

The magnets are each held in the discoid support by holding means, an interval being left between the magnets.

The motors with axial flux are frequently used as a motor having mass torques greater than those generated by motors with radial flux. They can therefore be used in low-speed applications.

For high-speed applications, the design of the rotor in a motor with axial flux is more complex because the forces due to centrifugal effects result in fairly high mechanical stresses in the rotor. In addition, the losses caused by Foucault currents become preponderant both in the magnets and in the rotating part when the latter is made of electrically conductive materials.

For a rotor that is required to rotate at high speeds of rotation, the principal disadvantage of a motor at a high speed of rotation resides in the high probability that the magnet or magnets will become detached from the rotor as well as the at least partial rupture of the rotor. The rotor of a motor of this type must therefore be capable of withstanding high speeds of rotation.

The prior art encourages the person having ordinary skill in the art to stiffen the discoid support of the magnet or magnets to counter the centrifugal force. This requires a specific material for the discoid support, along with an increase in its thickness so that the discoid support is more rigid.

This solution has not been entirely satisfactory because the motor or generator thus equipped with a discoid support is both heavier and costs more to manufacture.

One solution can be to create mesh structures of elongated unitary magnets in fiber-reinforced and resin structures to reduce the Foucault currents and to use a body made of a composite material for the rotor that does not conduct electricity, ideally a rotor made of fiberglass, with a binding band placed on the periphery of the rotor to contain the forces due to centrifugal effects.

However, for applications in which the speeds become very high, the mechanical stresses become such that it is necessary to reduce the magnet mass to achieve these speeds of rotation. However, the torque that must be delivered by an electrical machine is proportional to the surface area of the magnets in interaction with the magnetic fields generated by the stators. A reduction of the magnetic surface area therefore entails a reduction of the torque and therefore of the power of the machine.

EP-A-0 353 042, which represents the closest prior art, describes a rotor of an electromagnetic motor or generator having a body comprising an internal hub concentric to a central axis of rotation of the rotor, branches extending radially in relation to the central axis of rotation starting from the internal hub toward a binding band forming a circular outer contour of the rotor, at least one magnet being housed in each space delimited between two adjacent branches, each branch having a decreasing width with the distance from the internal hub and ends in a tapered tip against the binding band, each magnet having an increasing width as the distance from the internal hub increases, ending against the binding band surrounding the rotor.

EP-A-2 773 023 describes a rotor with the characteristics described above without mentioning the tapered branches.

The teaching of these two documents does not allow a support of multiple permanent magnets which can, on one hand, effectively hold the permanent magnets supported on the rotor, preventing the magnets from detaching from the rotor while effectively compensating for the centrifugal force and, on the other hand, having a mechanical strength such that the rotor can rotate at very high speeds.

An arrangement of unitary magnets independent of one another also has the major disadvantage that it is sensitive to spatial harmonics or currents generated by the state or windings. Consequently, the losses generated in the magnet structures are very high and the output, particularly at high speed, is reduced.

FR-A-1 475 501 does not describe a rotor but only a magnet structure comprising a plurality of unitary magnets without specifying an application for this magnet structure or suggesting that the disadvantages of the two above referenced documents can be overcome by the use of such a magnet structure with a plurality of unitary magnets, given that the use of such a magnet structure for a rotor is not mentioned in this document.

SUMMARY

The problem addressed by the present invention is to design a rotor for the support of a plurality of permanent magnets equipped with a binding band for an electromagnetic machine with axial flux which can, on one hand, effectively hold the permanent magnets that the rotor supports, preventing the magnets from detaching from the rotor, while effectively compensating for the centrifugal force and, on the other hand, have a mechanical strength such that the rotor can rotate at very high speeds.

For this purpose, the present invention relates to a rotor of an electromagnetic motor or generator having a body comprising an internal hub concentric to a central axis of rotation of the rotor, branches extending radially with respect to the central axis of rotation starting from the internal hub toward a binding band forming a circular external contour of the rotor, at least one magnet being housed in each space delimited between two adjacent branches, each branch having a decreasing width with the distance from the internal hub, ending in a tapered tip against the binding band, each magnet having an increasing width with the distance from the internal hub, ending against the binding band surrounding the rotor, characterized in that each magnet is in the form of a magnet structure constituted by a plurality of unitary magnets joined together by a fiber-reinforced insulating material, each unitary magnet having an elongated shape and extending in the axial direction of the rotor.

The configuration of the rotor according to the present invention is based on the finding that the maximum stresses applied to a rotor at very high speed occur at the level of the hub surrounding the median axis of rotation of the rotor. It is therefore necessary to strengthen this internal portion of the rotor. This strengthening is achieved at the expense of the magnets located in this zone which must be replaced by a broadened hub. It is also necessary to equip the rotor with relatively thick branches at least at the level of their connection with the hub. However, the thicker the shape of the branches the fewer the magnets.

The principal idea on which the present invention is based is that the branches need to be substantially thickened only at their connection with the hub because the stresses exerted on the rotor decrease with the distance from the center of the rotor.

For applications where the linear velocities become very high, typically starting at 160 m/s or 180 m/s, the mechanical stresses become such that it is necessary to reduce the magnetic mass to achieve these speeds of rotation. This has the major disadvantage that the torque that must be delivered by an electrical machine is proportional to the surface area of magnets in interaction with the magnetic fields produced by the stators. A reduction of the magnetic surface area therefore entails a reduction of the torque and therefore of the power of the machine. There is also a strong bias in favor of increasing the width of the branches at the level of the outer periphery of the hub, in particular when the radius of the hub is also increased.

The applicant is aware that, in the case of a machine with axial flux, the torque is proportional to the cube of the radius of the rotor. Consequently, it is more effective to increase the surface area of magnets on the periphery of the rotor than in the more inward portions of the rotor. Therefore the absence of a magnet in proximity to the axis of rotation can be easily compensated by the addition of a magnet on the periphery of the rotor, which can be achieved by configurations of branches, the width of which decreases with the distance from the center of the rotor to only tapered tips that have a width close to zero.

It is therefore desirable to increase the surface area of the cross section of the branches of the rotor at the level of their connection with the hub and to decrease this cross section gradually to increase the cross section of the surfaces of magnets to maintain a high motor torque.

That has never been considered by the prior art which used only branches of a constant width and hubs of a low radius to allow space for magnets. Therefore there was a strong bias in favor of reducing the distribution of the magnets on the rotor to increase the mechanical strength of the rotor and the prior art was oriented toward other solutions such as an increase of the branches and of the hub in the axial direction, which would increase the weight of the rotor without having a major beneficial effect on its strength.

An additional synergy achieved by the present invention is that the rotor can have unitary magnets grouped into a magnet structure between each two branches. Each three-dimensional magnet structure is constituted by a plurality of unitary magnets.

This makes it possible to have a magnet structure that has numerous unitary magnets. It has been determined that a structure with a plurality of unitary magnets has a high level of insensitivity to spatial harmonics or currents generated by the stator windings. Consequently, the losses generated in the magnet structures are very low and the output, in particular at high speed, is very high. A magnet structure of this type can form a magnetic pole or can be a complete magnet.

One of the measures according to the present invention is to break down a magnet structure, which in the prior art can be a complete magnet or a magnetic pole, into a plurality of small or micro-magnets. A large magnet is subject to greater Foucault current losses than its equivalent in small or micro-magnets. The use of small magnets or micro-magnets therefore makes it possible to reduce these losses which are prejudicial to the operation of the electromagnetic actuator.

It is known that, to obtain a magnetic field of optimum intensity, the ideal volume of a magnet must approach that of a cube or a cylinder whose length is equal to its diameter. It is common knowledge that increasing the length of a magnet beyond that does not achieve any further increase of the magnetic field. However, the approach taken by the present invention runs contrary to this generally held opinion.

The length of a unitary magnet is significantly increased with respect to the diameter or to a diagonal of its flat longitudinal surface compared to conventional practice, essentially to respond to requirements regarding the mechanical strength of the structure, which is the principal purpose of the present invention.

The applicant has discovered that a plurality of unitary magnets in a magnet structure results in a magnet structure that has a mechanical strength that is much greater while retaining magnetic properties that are practically similar to those of a single magnet having a surface area equal to n times the elementary surface area of the n magnets when there are n unitary magnets.

Advantageously, the tapered tip of each branch is at least two times narrower than a base of the branch connected to the internal hub.

Advantageously, the bases of two adjacent branches are separated by an intermediate portion of the internal hub, the intermediate portion having a concave shape rounded toward the axis of the rotor, the inner hub having a radius equal to at least one-quarter of a radius of the rotor.

The curvatures toward the inside of the intermediate portions between branches make it possible to reduce the mechanical stresses at the level of the thickest cross-section of the branches supported on the external periphery of the hub.

Advantageously, the hub and the branches are made of fiberglass cast in resin. These reinforcing fibers contribute to increasing the strength of the magnet structure and in particular to its flexural rigidity and resistance to buckling.

Advantageously, the hub and the branches are in one piece. This increases the mechanical strength of the assembly and consequently of the rotor.

Advantageously, each unitary magnet of the plurality of unitary magnets is in the shape of a polygon or each unitary magnet has an at least partly ovoid contour comprising a first portion forming the body of the unitary magnet having a larger cross-section and extending over a greater length of the unitary magnet than at least one second longitudinal end portion pointing toward an associated longitudinal extremity of the magnet, with a cross-section that decreases as it approaches the longitudinal extremity.

The ovoid magnets can have facets. The unitary magnets thereby obtained are "crystals" associated with one another which are not connected over the entire surface of their facets or longitudinal facets. Layers of resin and adhesive are used to construct a mesh network on the extremities of the poly-faceted blocks with limited areas of contact between magnets.

Alternatively, for unitary magnets having a perfectly ovoid shape with a rounded first portion, the contact between two adjacent unitary magnets is smaller and can only be spot contact, and corresponds essentially to a small circular arc between the two unitary magnets. A groove can be hollowed out that is the size of the circular arc of contact between two adjacent unitary magnets to receive the adhesive, which is advantageously in the form of resin.

Each magnet structure advantageously includes at least one mesh structure that has cells, each of which delimits a housing for a respective unitary magnet, each housing having internal dimensions that are just sufficient to allow the introduction of a unitary magnet into its interior, while leaving a space between the housing and the unitary magnet which is filled by a fiber-reinforced resin, the mesh structures being made of fiber-reinforced insulating material.

The mesh structure remains in place and can also be coated with a layer of composite material. A mesh structure of this type makes it possible to hold the unitary magnets in place during the fabrication of the magnet structure and has the advantage that it represents an additional reinforcement element of the magnet structure, whereby the mesh structure can also contain reinforcement fibers.

For example, a honeycomb mesh structure is known to increase the strength of an element, in this case a magnet structure. The unitary magnets are inserted into the hexagonal housings that hold them in place. The walls of the housings act as electrical insulation and the density of the housings in the magnet structure can be significantly increased. The honeycomb mesh structure can be made of fiber-reinforced insulating composite material.

The binding band is advantageously made of fiberglass or carbon fiber. The composite binding band circumferentially surrounds the large magnets or the magnet structures on an outer periphery of the rotor. If necessary, the binding band contributes to the radial hold of the magnets in addition to the hold guaranteed by the outer layer of composite coating. The tapered tips of the branches can optionally be fastened to the binding band.

The magnet structure between two adjacent branches is advantageously embedded in a layer of composite, whereby the rotor is also coated in a layer of composite.

Cover discs are advantageously located on each circular surface of the rotor.

The above applies principally but not uniquely for magnet structures comprising a plurality of unitary magnets. The large magnets used for the rotor in the prior art dissipate a large quantity of heat. The dissipation of this quantity of heat would make it impossible to use axial holding means in the form of composite cover discs and the dissipation of heat could have consequences on the integrity of the coating, resulting in the accelerated aging of this coating as well as of the magnets.

The composite cover discs are infrequently used in the prior art because they cannot withstand the dissipation of heat caused by the magnets.

Because the present invention preferably utilizes a multitude of unitary magnets replacing a compact magnet of the prior art, the dissipation of heat is less and the cover discs can be used as axial holding means, these discs advantageously replacing axial holding means between the magnets and rotor body, which in some cases require modifications to the magnets or their coating to realize additional fastening means with the fastening means carried by the rotor.

The invention further relates to a method for the fabrication of a rotor of the type described above, in which the width of each branch at a point of its length extending radially from the outer periphery of the hub to the inner periphery of the binding band is determined on the basis of an evaluation of an allowable mechanical stress likely to be applied to the rotor, a maximum allowable speed of rotation of the rotor and a mechanical strength of the material of the branch, a decrease of the width of each branch with the distance from the hub being obtained by selecting for each branch a width for each point on its length that makes it possible to achieve iso-stress in the interior of the branch.

Without being restrictive, the maximum stress exerted on a branch toward its extremity connected to the hub can be estimated at 120 mega Pascals. The achievement of this iso-stress makes it possible to minimize the width of the branch and therefore to more effectively utilize the surface area of large magnets or magnet structures, therefore in this latter case more unitary magnets, which makes it possible to achieve greater torque and additional compensation for the loss of magnet surface area toward the hub.

Finally, the invention relates to an electromagnetic motor or generator with axial flux characterized in that it comprises at least one rotor of the type described above, the electromagnetic motor or generator comprising at least one stator carrying at least one coil, the electromagnetic motor or generator comprising one or more air gaps between the at least one rotor and the at least one stator.

The electromagnetic motor or generator advantageously comprises at least one rotor associated with two stators.

BRIEF DESCRIPTION OF THE DRAWINGS

Other characteristics, objects and advantages of the present invention are explained in greater detail below and with reference to the accompanying drawings, which are provided by way of illustrating nonrestrictive examples, and in which.

DETAILED DESCRIPTION OF THE INVENTIONS

Figure 1:
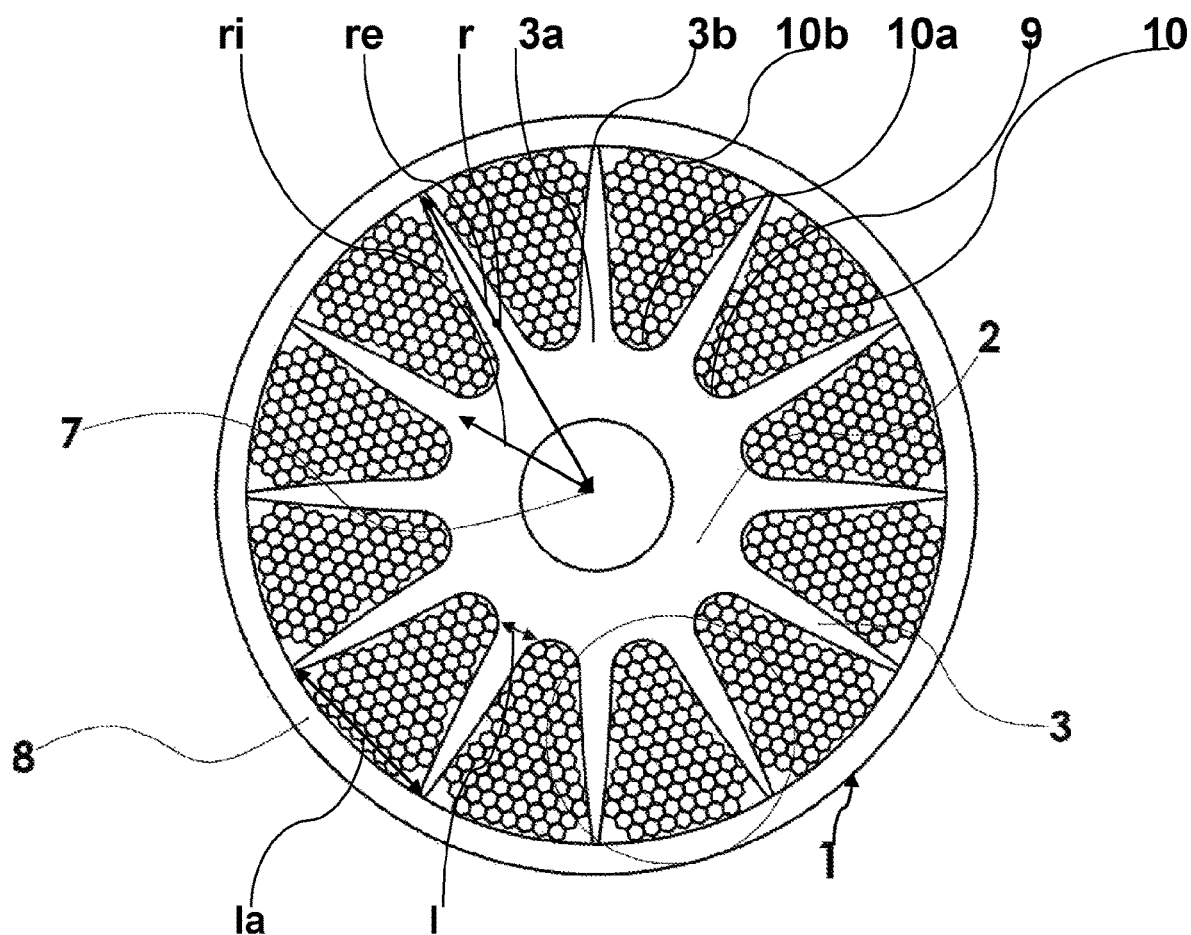
FIG. 1 is a schematic head-on view of a rotor intended for an electromagnetic machine with axial flux according to a first embodiment of the present invention, magnet structures composed of unitary magnets being inserted each between two adjacent branches of a discoid support of the magnets, the branches having a width that decreases with the distance from the rotor hub.

The figures are provided by way of example and are in no way restrictive of the invention. They constitute schematic representations intended to facilitate an understanding of the invention and are not necessarily drawings to scale of practical applications. In particular, the dimensions of the different parts are not representative of reality.

In the following text, a single branch 3, a single base 3a and a single tapered tip 3b of the branch 3 are representative of all the branches in FIGS. 1 and 2. The same is true for a single magnet structure identified as 10 with inner surfaces 10a and outer surfaces 40b, likewise a single intermediate portion 9 between two branches for all the intermediate portions.

Figure 2:
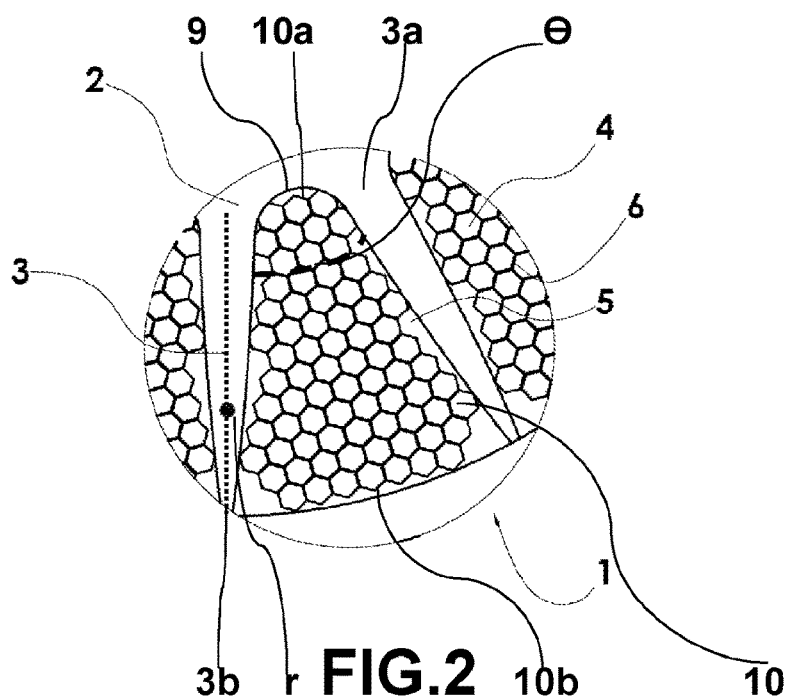
FIG. 2 is an enlarged schematic representation of a portion of the rotor illustrated in FIG. 1, FIGS. 3a, 3b and 3c are schematic representations for FIGS. 3a and 3b of a respective embodiment of a unitary magnet having an ovoid shape, and for FIG. 3c of a magnet structure comprising ovoid unitary magnets, four ovoid unitary magnets being shown separated from the magnet structure.

In FIG. 2, a single unitary magnet 4 is representative of all the unitary magnets, likewise a single layer of adhesive 6 between unitary magnets and a single external layer 5 enveloping a magnet structure 10.

Everything that is stated with regard to one of these representative elements applies to all similar elements not identified individually.

With reference to all the figures and in particular to FIGS. 1 and 2, these figures show respectively a rotor 1 and an enlarged illustration of a portion of a rotor 1 according to the present invention with two branches 3 with, interposed between them, a magnet structure 10 composed of a plurality of polygon-shaped unitary magnets 4.

This embodiment is not restrictive and a single large magnet can be inserted between two branches 3, whereby this single large magnet must not be confused with the unitary magnets 4 of a magnet structure 10 that are visible and referenced in FIG. 2.

A rotor 1 of this type can be used in an electromagnetic motor or generator, advantageously with axial flux. The rotor 1, which is advantageously essentially circular, has a body comprising an internal hub 2 concentric to a central axis of rotation 7 of the rotor 1 or the longitudinal median axis of the rotor 1. Branches 3 extend radially in the rotor 1 in relation to the central axis of rotation 7 starting from the internal hub 2 toward a binding band 8 that forms a circular outer contour of the rotor 1.

At least one magnet structure 10 comprising a plurality of small unitary magnets 4 is housed in each space defined between two adjacent branches 3.

Figure 4:
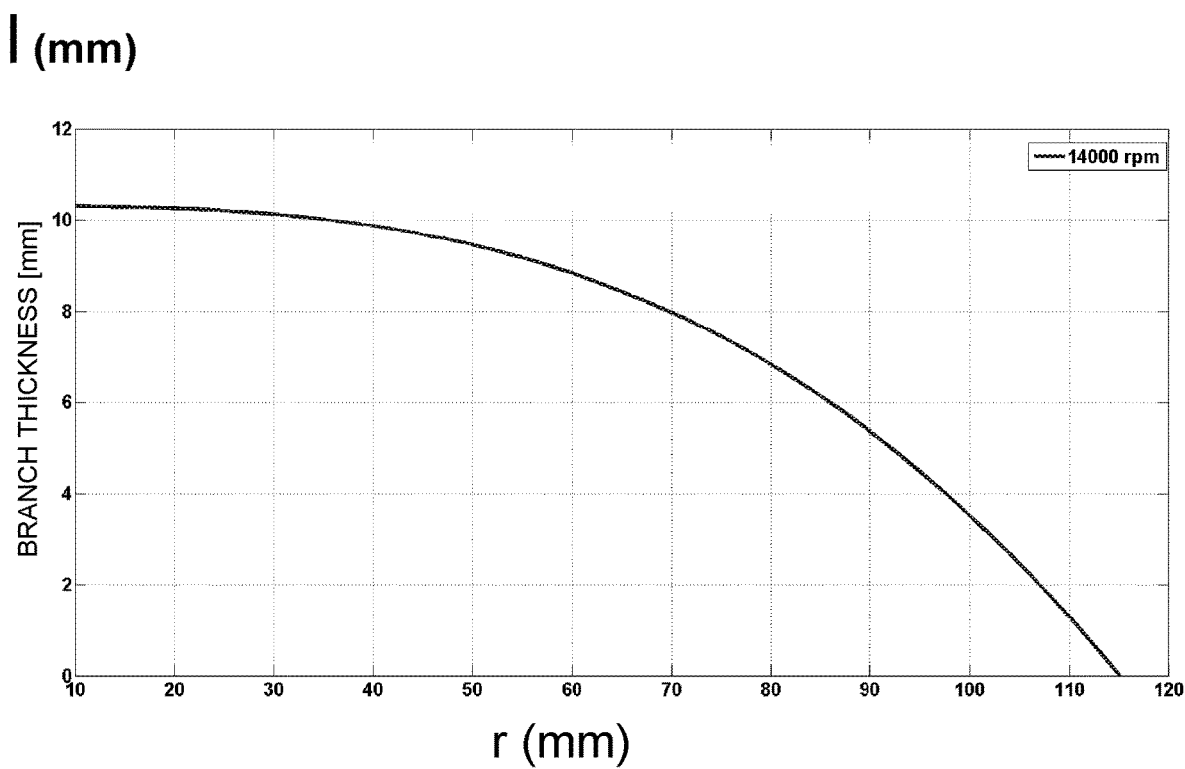
FIG. 4 shows a curve of the width of a branch of a rotor according to the present invention as a function of a point located at a distance r from the central axis of rotation of the rotor, the branch having a width that decreases with the distance from the central axis of rotation of the rotor.

In accordance with the present invention, each branch 3 has a width l, visible in FIGS. 1 and 4, that decreases with the distance from the inner hub 2 and ends in a tapered tip 3b against the binding band 8. The width l is shown for the greatest width of branch 3 in FIG. 1, i.e. at the base 3a of this branch 3a connected to the hub 2.

Each magnet structure 10 has a width that increases with the distance from the inner hub 2 and ends against the binding band 8 surrounding the rotor 1. This is the greatest width of the magnet structure 10 which illustrates the width la in FIG. 1.

The space lost for magnets as the width l of the branches 3 increases toward their extremity or base portion 3a facing the hub 2 and, if necessary, also as a result of increasing the radius of the hub 2 is made up in the peripheral end portions of the rotor 1. The placement of each magnet structure 10 with its greatest width la oriented toward the outer periphery of the rotor 1 makes it possible to increase the magnetic portions located on the periphery of the rotor 1 and therefore to increase the total magnetic surface area.

Still with reference to FIGS. 1 and 2, the tapered tip 3b of each branch 3 can be at least two to four times narrower than a base 3a of the branch 3 connected to the inner hub 2.

As can be more easily seen in FIG. 2 for a single base 3a, the bases 3a of two adjacent branches 3 can be separated by an intermediate portion 9 of the inner hub 2. This intermediate portion 9 can have a concave shape rounded toward the axis of the rotor 1. Likewise, alternatively or additionally, with reference in particular to FIG. 1, the inner hub 2 can have a radius ri equal to at least one-quarter of a radius of the rotor 1, which in fact is a hub 2 larger than a hub 2 of the prior art. The radius of the rotor is equal to the radius re of a branch 3, to which radius re a thickness of the binding band 8 is added.

The hub 2 and the branches 3 can be made of fiberglass cast in resin. Strong plastic fibers can also be used to increase the strength of the rotor 1 and in particular the flexural and strength and resistance to buckling.

To strengthen the rotor 1, the rotor 1 and the branches 3 can be in one piece. The branches 3 can optionally be connected to the binding band 8 by means of their tapered extremity 3b.

With reference to FIGS. 1, 2 and 3a to 3c, each magnet structure 10 can be constituted by a plurality of unitary magnets 4 joined together by a fiber-reinforced insulating material, each unitary magnet 4 having an elongated shape and extending in the axial direction of the rotor 1. The unitary magnets 4, only one of which is identified in the figure, must not be confused with the magnet structures 10 or with large magnets which are not shown in the accompanying figures.

It follows that each magnet structure 10 can be in three dimensions and constituted by a plurality of unitary magnets 4.

In FIGS. 1 and 2, each unitary magnet 4 of the plurality of unitary magnets 4 is in the shape of a polygon.

Figure 3A:
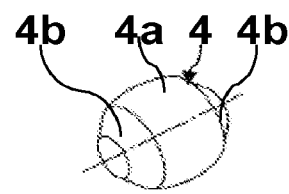
Figure 3B:
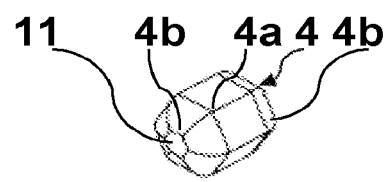
Figure 3C:
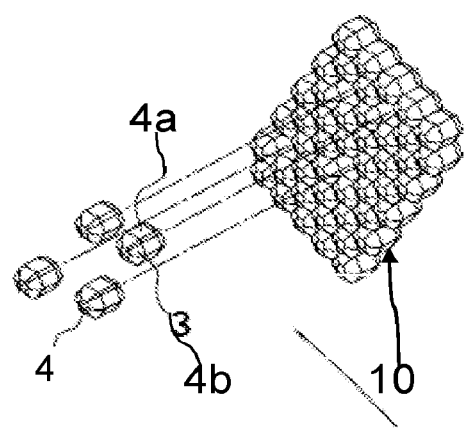

In FIGS. 3a, 3b and 3c, each unitary magnet 4 can have an at least partly ovoid contour, comprising a first portion 4a forming the body of the unitary magnet 4 having a larger cross-section and extending over a greater length of the unitary magnet 4 than at least one second longitudinal end portion 4b pointing toward an associated longitudinal extremity of the unitary magnet 4, the cross-section of which decreases approaching the longitudinal extremity.

In FIG. 3a, the unitary magnet 4 has an almost perfect ovoid shape with a first portion 4a and two second rounded end portions 4b and having a convex shape. As can be seen in FIG. 3c, the contact between two adjacent and ovoid unitary magnets 4 is essentially spot contact or extends along a limited circular arc.

In this case, the unitary magnet 4 can have an at least partly ovoid exterior contour with the first portion 4a forming the body of the unitary magnet 4 having a larger cross-section and extending over a greater length of the unitary magnet 4 than the at least one second portion 4b.

In FIG. 3b, the unitary magnet 4 can have at least one second portion 4b on at least one longitudinal extremity of the unitary magnet 4 as an extension of the first portion 4a. There can be two second portions 4b with one second portion 4b respectively on a longitudinal extremity of the unitary magnet 4.

The second portion or portions 4b can point toward an associated longitudinal extremity of the magnet, with a cross-section that decreases approaching the longitudinal extremity.

As illustrated in FIG. 3b, the second longitudinal end portions 4b can be dished or can have a convex shape. The second longitudinal end portion or portions 4b can end at their associated longitudinal extremity in a median facet 11 forming the longitudinal extremity. In FIG. 3b, for the ovoid shape, however, this median facet 11 forming the longitudinal extremity is dished and only optional.

In this FIG. 3b, the second longitudinal end portion or portions 4b can comprise lateral facets inclined toward a longitudinal axis of the unitary magnet 4 approaching the associated longitudinal extremity of the unitary magnet 4.

As illustrated in FIG. 3c, in a magnet structure 10, the unitary magnets 4 are directly adjacent to one another and are in partial contact. The unitary magnets 4 are adhesively connected by a deposit of adhesive. The plurality of unitary magnets 4 creates a mesh structure of magnets without the interposition of retaining elements between one another other than the adhesive, the unitary magnets 4 being in direct contact between adjacent magnets. The first portion 4a and the second portion 4b for unitary magnets are also illustrated in this FIG. 3c.

In FIG. 2, the unitary magnets 4 are adhesively connected to one another without a mesh structure between them. The same is true for FIG. 3c. In FIG. 2, reference number 5 designates the layer of adhesive of the magnet structure 10 with the branches 3, this layer of adhesive being shown on a larger scale to make it more visible. The adhesive can be a layer of composite, an adhesive resin, advantageously thermosetting or thermoplastic.

Reference number 6 designates a space filled with adhesive between two unitary magnets 4, whereby the adhesive between unitary magnets 4 can be similar to the adhesive of the magnetic structure 10 or of a large magnet between two branches 3. Each magnet structure 10 between two adjacent branches 3 can also be embedded in a layer of composite, the rotor 1 also being coated in a layer of composite in its entirety.

There can therefore be a superposition of a first layer of composite to surround the unitary magnets 4, a second layer of composite to individually surround the magnet structures 10 and a third layer of composite to coat the rotor 1.

As not shown in the figures but serving as references that have already been identified in the figures for similar elements, each magnet structure 10 can include at least one mesh structure having mesh cells, each delimiting a housing for a respective unitary magnet 4. Each housing can have internal dimensions that are just sufficient to allow the introduction of a unitary magnet 4 into its interior while leaving a space between the housing and the unitary magnet 4 filled by a fiber-reinforced resin, the mesh cells being made of fiber-reinforced insulating material.

The binding band 8 can be made of fiberglass or carbon fibers. The composite binding band 8 circumferentially surrounds the magnet structures 10 or the large magnets on an outer periphery of the rotor 1. The binding band 8 contributes, if necessary, to the radial hold of the magnet structures 10 or of the large magnets in addition to the hold guaranteed by the external layer of composite coating. The tapered tips 3b of the branches 3 can optionally be connected to the binding band 8.

Cover discs, not shown in the figures, can be located on each circular face of the rotor 1 to prevent an axial movement of the magnet structures 10 or of the large magnets between two branches 3.

The invention further relates to a method for the fabrication of a rotor 1 as described above, in which the width 1 of each branch 3 at a point on its length extending radially from the outer periphery of the hub 2 to the inner periphery of the binding band 8 at a known distance from the central axis of rotation 7 of the rotor 1 is determined on the basis of an evaluation of an allowable mechanical stress likely to be applied to the rotor 1, an allowable maximum speed of rotation of the rotor 1 and a mechanical strength of the material of the branch.

A decrease in the width 1 of each branch 3 with the distance from the hub 2 is achieved by selecting for each branch 3 a width 1 for each point on its length that makes it possible to achieve iso-stress in the interior of the branch 3.

FIG. 4, also with reference to FIGS. 1 and 2, shows by way of a non-restrictive example a curve indicating the width 1 of a branch 3 in millimeters (mm) as a function of a distance of a point r measured in the length of the branch 3 with respect to the central axis 7 of the rotor 1, where r is expressed in millimeters (mm). This curve is drawn for an arbitrarily selected speed of rotation of the rotor 1 of 1,400 revolutions per minute or rpm, whereby another speed can also be selected, in particular a maximum allowable speed of rotation of the rotor 1.

The curve shows that the width 1 of the branches 3 decreases and therefore r increases as the distance from the central axis 7 of the rotor 1 increases. As shown in FIGS. 1 and 2, for which two different points r are shown, the distance of the point r from the central axis 7 of the rotor 1 is between the radius of the hub 2 identified as ri for an inside radius and the inside radius of the binding band 8 equivalent to the outside radius re of each magnet structure 10.

In FIG. 2, an angle θ is visible between two branches. This FIG. 2 as well as FIG. 1 show that an outer surface 10b of the magnet structure 10 adjacent to the binding band 8 is larger than the inner surface 10a of the magnet structure 10, which means that there is a greater magnet surface toward the outer periphery of the rotor 1 than toward the hub 2.

Finally, the invention relates to an electromagnetic motor or generator with axial flux comprising at least one rotor 1 as described above, the electromagnetic motor or generator comprising at least one stator carrying at least one coil, the electromagnetic motor or generator comprising one or more air gaps between the at least one rotor 1 and the at least one stator.

The electromagnetic motor or generator can preferably comprise at least one rotor 1 associated with two stators.

The invention claimed is:

1. A rotor (1) of an electromagnetic motor or generator having a body comprising:
   an internal hub (2) concentric to a central axis of rotation (7) of the rotor (1), branches (3) extending radially in relation to the central axis of rotation (7) starting from the internal hub (2) toward a binding band (8) forming a circular external contour of the rotor (1), and
   at least one magnet being housed in each space defined between two adjacent branches (3), each branch (3) having a width (1) that decreases with the distance from the internal hub (2) to end in a tapered tip (3b) against the binding band (8), each magnet (10) having a width (1a) that increases with the distance from the internal hub (2) ending against the binding band (8) surrounding the rotor (1), characterized in that each magnet is in the form of a magnet structure (10) comprising a plurality of unitary magnets (4) joined together by a fiber-reinforced insulating material, each unitary magnet (4) having an elongated shape and extending in the axial direction of the rotor (1); wherein each unitary magnet (4) of the plurality of unitary magnets (4) is in the shape of a polygon or each unitary magnet (4) has an at least partly ovoid contour and comprises a first portion (4a) forming the body of the unitary magnet (4) having a larger cross-section and extending over a greater length of the unitary magnet (4) than at least one second portion (4b), said second portion being a longitudinal end portion pointing toward an associated longitudinal extremity of the unitary magnet (4), the cross-section of which decreases as it approaches the longitudinal extremity.

2. A rotor (1) according to claim 1, in which the tapered tip (3b) of each branch (3) is at least two times narrower than a base (3a) of the branch (3) connected to the internal hub (2).

3. A rotor (1) according to claim 2, in which the bases (3a) of two adjacent branches (3) are separated by an intermediate portion (9) of the internal hub (2), the intermediate portion (9) having a concave shape rounded toward the axis of the rotor (1), the internal hub (2) having a radius (ri) equal to at least one-quarter of a radius of the rotor (1).

4. A rotor (1) according to claim 1, in which the hub (2) and the branches (3) are made of glass fibers cast in resin.

5. A rotor (1) according to claim 4, in which the hub (2) and the branches (3) are in one piece.

6. A rotor (1) according to claim 1, in which each magnet structure (10) includes at least one mesh structure having mesh cells, each delimiting a housing for a respective unitary magnet (4), each housing having internal dimensions that are just sufficient to allow the introduction of a unitary magnet (4) in its interior, while leaving a space between the housing and the unitary magnet (4) filled by the fiber-reinforced insulating material, the mesh cells being made of the fiber-reinforced insulating material.

7. A rotor (1) according to claim 1, in which each magnet structure (10) between two adjacent branches (3) is embedded in a layer of composite, the rotor (1) also being coated in a layer of composite.

8. A rotor (1) according to claim 1, in which cover discs are located on each circular face of the rotor (1).

9. A method for the fabrication of a rotor (1) according to claim 1, in which the width (1) of each branch (3) at a point on its length extending radially from the outer periphery of the hub (2) to the inner periphery of the binding band (8) is determined on the basis of an evaluation of an allowable mechanical stress likely to be applied to the rotor (1), an allowable maximum speed of rotation of the rotor (1) and a mechanical strength of the material of the branch (3), a decrease of the width (1) of each branch (3) farther from the hub (2) being achieved by selecting for each branch (3) a width (1) for each point on its length that makes it possible to achieve iso-stress in the interior of the branch (3).

10. An electromagnetic motor or generator with axial flux characterized in that it comprises at least one rotor (1) according to claim 1, the electromagnetic motor or generator comprising at least one stator carrying at least one coil, the electromagnetic motor or generator comprising one or more air gaps between the at least one rotor (1) and the at least one stator.

11. An electromagnetic motor or generator according to claim 10, which comprises at least one rotor (1) associated with two stators.

\* \* \* \* \*